United States Patent [19]

Wen

[11] Patent Number: 4,777,569

[45] Date of Patent: Oct. 11, 1988

[54] THREE-WAY LAMP ASSEMBLY FOR AUTOMOBILES

[76] Inventor: Hung-Sheng Wen, 3F, 5, Lane 14, Yung Kang Street, Taipei 10621, Taiwan

[21] Appl. No.: 65,000

[22] Filed: Jun. 19, 1987

Related U.S. Application Data

[63] Continuation-in-part of Ser. No. 021,770, Mar. 4, 1987, abandoned.

[51] Int. Cl.$^4$ ............................ B60Q 1/00; B60Q 1/26
[52] U.S. Cl. ........................................ 362/80; 362/251
[58] Field of Search .................... 362/61, 74, 80, 227, 362/231, 235, 293, 427, 249, 251, 362

[56] References Cited

U.S. PATENT DOCUMENTS

| | | | |
|---|---|---|---|
| 3,193,673 | 7/1965 | Herring | 362/80 |
| 3,515,863 | 6/1970 | Jungwirth | 362/74 |
| 3,576,409 | 4/1971 | Fiddler | 362/80 |
| 3,582,639 | 6/1971 | Chamberlain | 362/80 |
| 3,895,197 | 7/1975 | Mizrahi | 362/80 |
| 3,905,017 | 9/1975 | Samra | 362/80 |
| 4,316,239 | 2/1982 | Cass et al. | 362/80 |
| 4,628,417 | 12/1986 | Kaminski et al. | 362/427 |
| 4,656,563 | 4/1987 | Segoshi et al. | 362/80 |
| 4,683,521 | 7/1987 | Poleschuk et al. | 362/80 |

Primary Examiner—Charles J. Myhre
Assistant Examiner—David A. Okonsky
Attorney, Agent, or Firm—Ladas & Parry

[57] ABSTRACT

A "three-way lamp assembly for automobiles" of the present invention which combines the functions of the third brake light, the parking and loading alarm light, and the in-compartment reading light of an automobile into a single assembly, consisting essentially of an upper cover, a lower housing, lamp holders, lamps, and other elements; the lower housing being approximately in the shape of a rectangular box which is provided with recesses, respectively, on the front and rear edges thereof, into which lamp shades are inserted, the interior of the box shaped lower housing being generally divided into two spaces with a spacer plate provided therebetween, and lamp holders and lamps being mounted in each of the spaces; the front half of the upper cover being provided with bent recesses of increasingly higher configuration into which a bent shaped lamp shade can be inserted and the rear half of the upper cover being a through passage, allowing light in the bent shaped lamp shade to be projected toward the rear of the automobile for alarming purpose; a hollow portion being provided on the right side of the upper housing for receiving a pair of control switches; the upper and lower housings being secured by means of screws.

4 Claims, 5 Drawing Sheets

THREE-WAY LAMP ASSEMBLY FOR AUTOMOBILES

This is a continuation-in-part of copending application Ser. No. 021,770, filed on Mar. 4, 1987, now abandoned.

The three-way lamp assembly for automobiles of the present invention combines the functions of the third brake light, the parking and loading alarm light, and the incompartment reading light of an automobile into a single assembly which is particularly suitable for light trucks with closed cargo compartment.

Today's light trucks 1, such as the one shown in FIG. 1, are usually used in a condition where no cargo compartment is installed, but many owners have their trucks equipped with made-to-order cargo compartments for sheltering from the sun and the rain. In such light trucks 1, because of being differently constructed from ordinary automobiles, there is no place for installing the "third brake light" as currently required by United States Department of transportation. This problem with such light trucks may be solved by installing a cargo compartment.

A disadvantage still exists in the light trucks having presently installed with a cargo compartment 2, that is, when a light truck has been parked for loading or unloading, either during the day or at night, there is no suitable means for alarming others about the parked car loading or unloading cargoes; in addition, when such trucks are used for family excursion purpose with passengers seated in the cargo compartment, there is no lamp available for lighting or reading. The lamp assembly of the present invention is directed to address the aforementioned disadvantage in that when the brake pedal is pressed down, a first set of the lamps will be turned on, functioning as the third brake light; when the car is parked on roadside for loading or unloading, a second set of the lamps may be turned on by lifting up the rear glass cover of the cargo compartment, allowing the light to be projected toward the rear of the truck for the purpose of alarming others about the parked car loading or unloading; and when the car is used for excursion, the second set of the lamps may also be turned on by pressing a button in the compartment, allowing the light to be projected inside the compartment for lighting or reading purposes. The foregoing are the objects of the present invention.

In FIG. 1 numeral reference 3 is a schematic representation of the lamp assembly of the present invention installed inside the cargo compartment.

The perspective view of the lamp assembly of the present invention is shown in FIG. 2.

Figure 1:
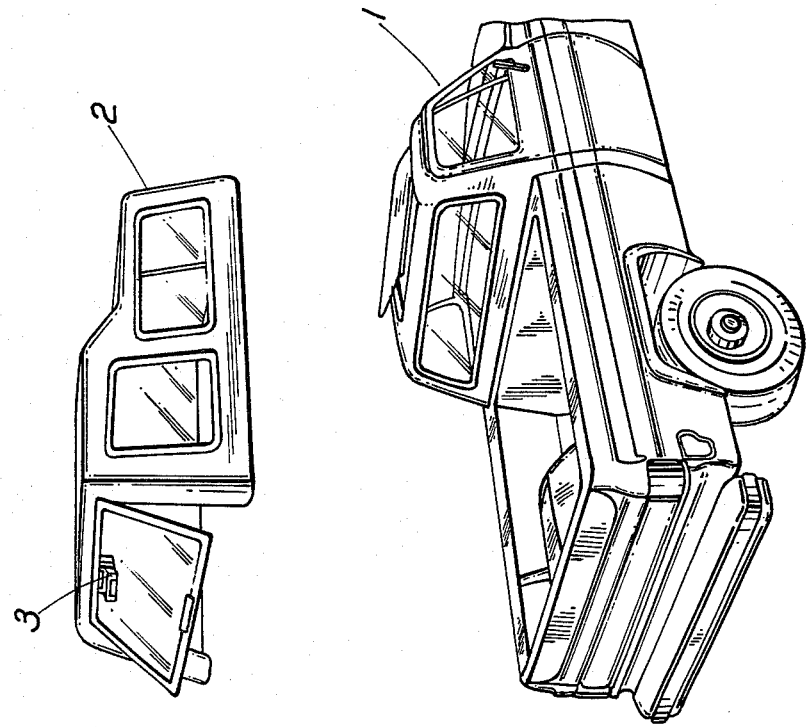
FIGS. 3, 3-1 and 3-2 show exploded views of the present invention.

For details of the way in which the lamp assembly is installed, reference should be directed to the following description and drawings. The upper frame of the glass cover on the back of the cargo compartment is designated with numeral 4 and the inner frame of the compartment is designated with numeral 5; the three-way lamp assembly for automobiles 3 of the present invention is threadly secured onto the inner compartment frame 5 through threaded holes 31. It is apparent from the details shown in FIGS. 2A and 2B that only pivotal movements are permitted between the upper frame 4 of the rear glass cover and the inner compartment frame 5.

Figure 2A:
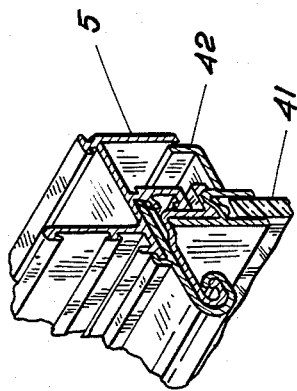
FIGS. 2A and 2B illustrate the glass cover position in the cargo compartment under different conditions.
Figure 2B:
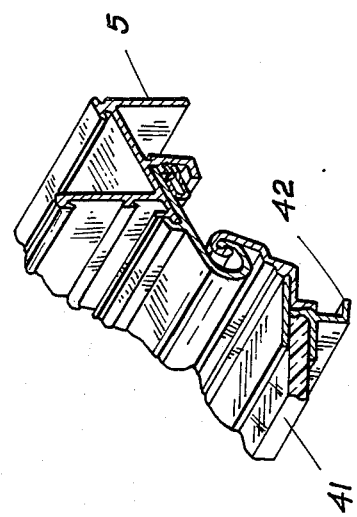
Figure 3:
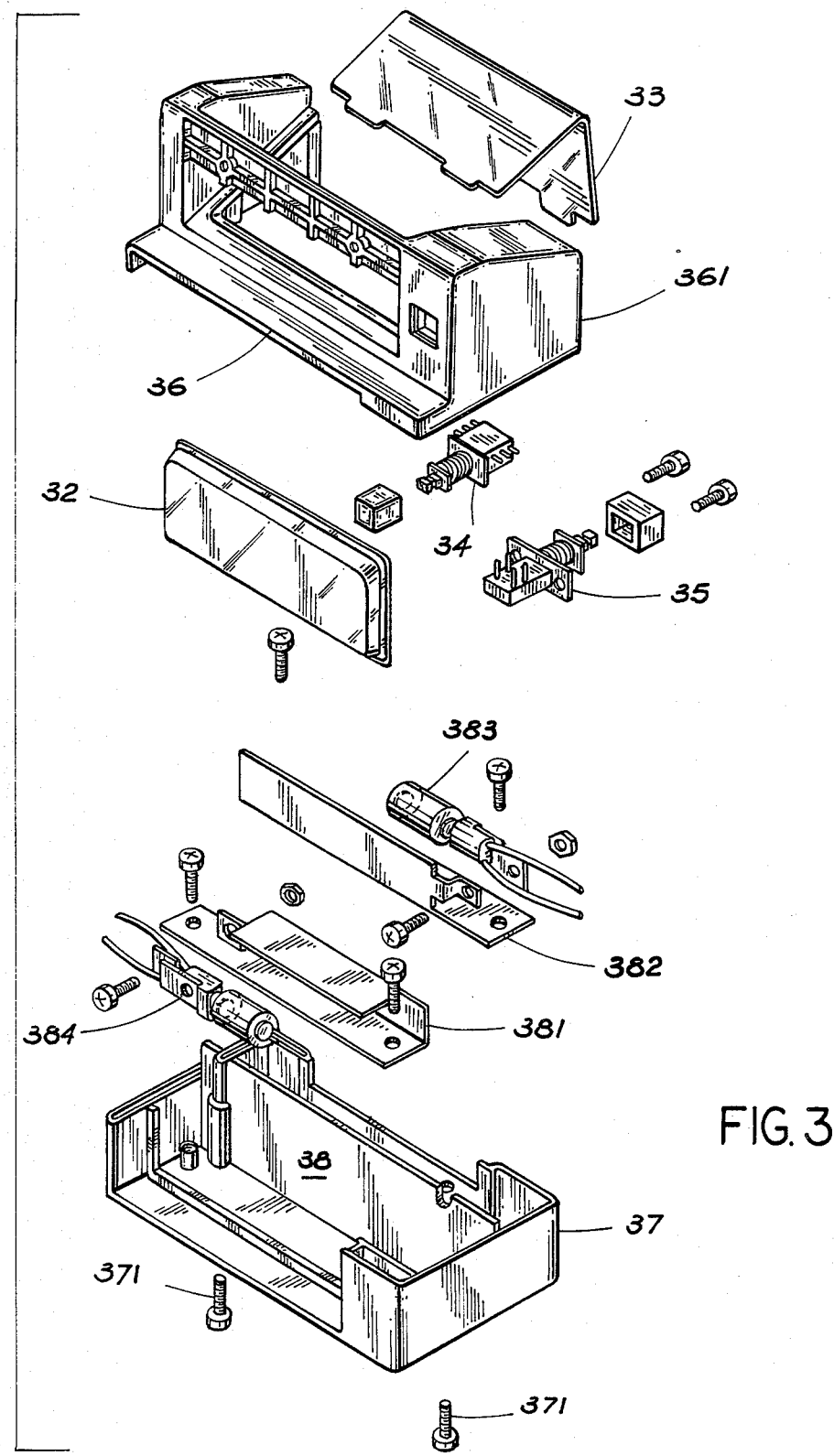
Figures 1, 3:
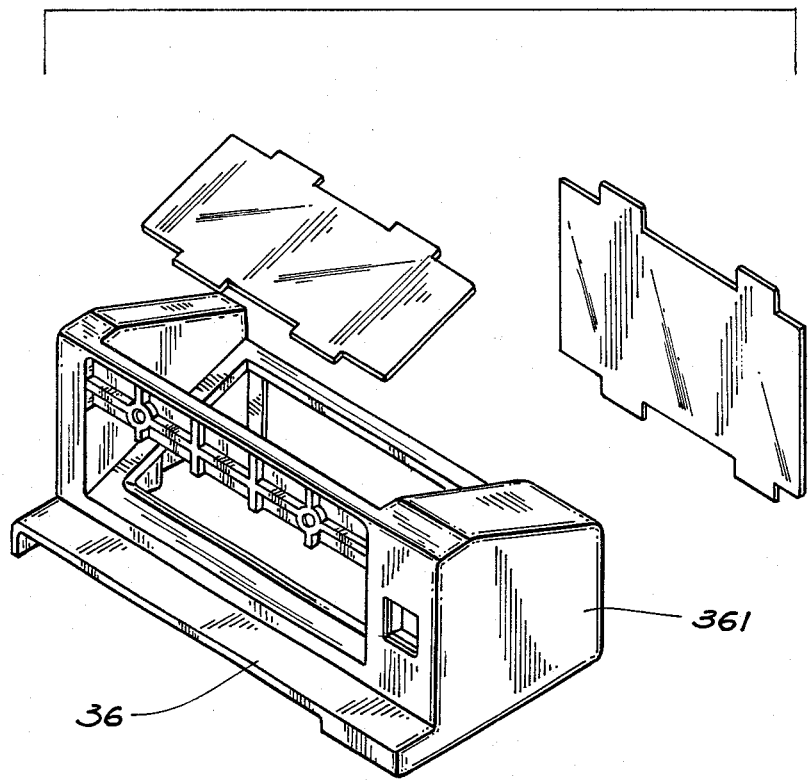
Figures 2, 3:
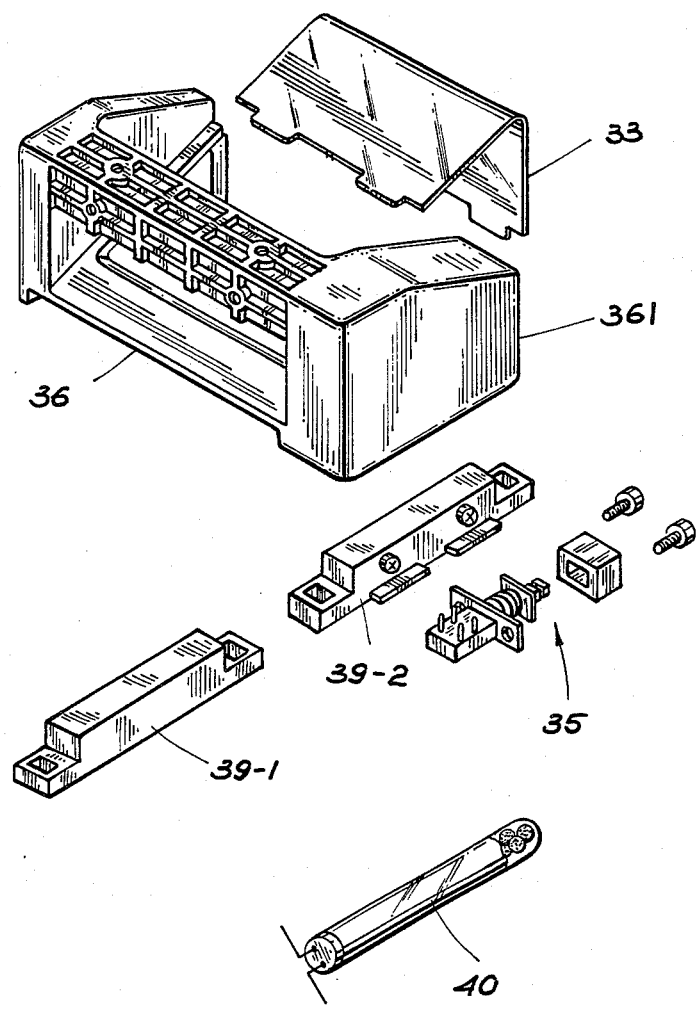

When the truck is in its usual driving condition, the glass cover 41 on the back of the cargo compartment being closed, as shown in detail in FIG. 2A, a control switch 34 is pressed by the front edge 42 of the upper frame 4 of the rear glass cover; then, when the brake pedal is pressed down as the case may require, the circuit of the third brake light is actuated, light being projected to the outside of the car from the lamp shade 32 for alarming the drivers following behind, that is to say, lamp shade 32 functioning as the shade for the third brake light. When the truck is parked on a roadside and the rear glass cover 41 on the cargo compartment lifted up, as shown in detail in FIG. 2B, the upper frame 4 of the rear glass cover is rotated at an angle relative to the inner compartment frame 5, then, the front edge 42 of the upper frame will be out of engagement with the control switch 34 to actuate the circuit, thus causing the second set of the lamps to be turned on, light being projected from the lamp shade 33, via the through passage in the rear of the upper housing, to the outside of the truck, thus effecting the function of alarming the drivers following behind; that is, when the rear glass cover 41 on the cargo compartment is lifted (see FIG. 1), the light projected off the truck from the lamp shade 33 serves to alarm the drivers coming from behind that the truck ahead is parked and loading or unloading cargoes. Accordingly, when the rear glass cover is closed after the loading or unloading, the control switch 34 will be pressed again, causing the circuit to be switched "off" and the light from the lamp shade 33 to disappear immediately. The light can be projected to the rear of the truck because the lamp shade 33 is bent shaped (a two-piece structure may also be used instead of the bent shaped lamp shade, as shown in FIG. 3-1). It can be seen from the following description and related drawings illustrating the detailed construction of the present invention that the bent plane is at an angle with the ground, thus allowing the light to be projected to the rear of the truck.

Now, the various elements of the present invention will be discribed herein after.

There is shown in FIG. 3 the exploded view of the present invention. It can be seen from the drawing that the lamp assembly of the present invention consists essentially of an upper cover 36, a lower housing 37, lamp shades 32, 33, switches 34, 35, lamp holders 381, 382, and lamp bulbs 383, 384. The front half of the upper cover is provided with bent recesses of increasingly higher configuration into which a bent shaped lamp shade 33 can be inserted, which shade 33 being provided with a lamp bulb 383 and a bulb holder 382, thus, when the truck is parked on a roadside with the glass cover of the cargo compartment lifted up, the circuit is actuated, causing the set of the lamp bulbs to be turned on and the light projected out the truck from the lamp shade 33; in addition, the rear half of the upper cover has a through passage thus allowing the light beam to pass through. The right portion 361 of the upper cover 36 is a hollow body with an opening in the bottom, allowing the insertion therethrough of two control switches 34, 35; the function of the switch 34 has been described hereinbefore while the switch 35 is used for the convenience of the passengers inside the compartment, when the passengers inside the compartment desire to turn the lamp bulb 383 on, the circuit is switched on by pressing the switch 35, so that the light beam projects out from the vertical plane of the lamp shade 33; for safety's sake, however, the switch 35 is invalidated when the rear glass cover on the rear of the compartment is lifted up with the switch 34 not being pressed, that is, the on and off operation of the lamp bulb 383 can not be controlled by the on and off of the switch 35; briefly, the switch 35 can control the on and off operation of the lamp bulb 383 only when the rear glass cover of the compartment is in the closed condition. Such control circuits, which are of techniques known to those skilled in the art, will not be described in further details. In addition to the switches 34, 35 of push type as shown in FIG. 3, some other kinds of switch can also be used, such as a reed switch 39, the magnet 39-1 of which is fixed on the upper frame 4 while the switch itself 39-2 on the device, or more preferably, a vacuum mecurry switch 40 which is fixed on the device and then mounted to the interior part of the rear glass cover 41, as are illustrated in FIG. 3-2.

Figure 2:
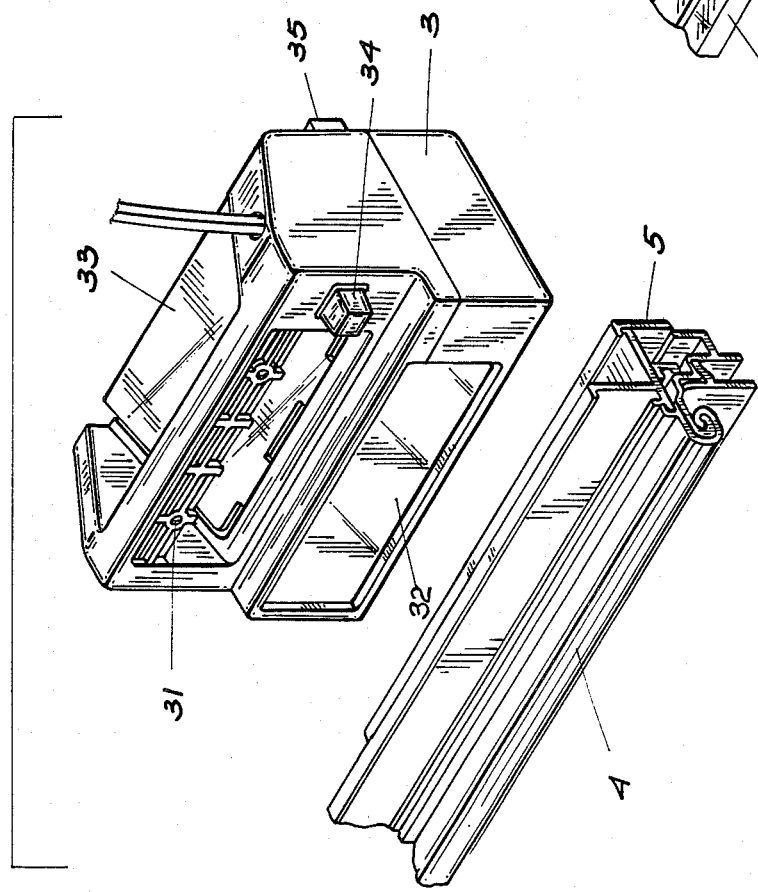

The lower housing 37 is approximately in the shape of a rectangular box which is provided with recesses on the front and rear edges thereof, respectively, the recess on the front edge being in mating relation with the recess on the front half of the upper cover 36 for inserting the lamp shade 33 while the recess on the rear edge being in mating relation with the recess on the rear half of the upper cover for inserting the lamp shade 32 (see FIG. 2). In addition, the interior of the lower housing 37 is generally divided into two spaces with a spacer plate 38 provided therebetween, lamp bulb holders 382, 381 and lamp bulbs 383, 384 being provided in the two spaces on either side of the space plate 38; the function of the lamp bulb 383 has been previously discribed while the lamp bulb 384 functions as the light source of the third brake light, that is, when the brake pedal is pressed, the circuit will be switched on to turn the lamp bulb 384 on, thus causing light beam to project out the truck from the lamp shade 32 for alarming the cars coming from behind, which functions the same as the third brake light currently in use. The upper cover 36 and the lower housing 37 are threadedly secured by means of screws 371.

The objects, the components and their functions of the present invention, the installation of the present invention on the cargo compartment of a truck, and the functions that can be expected of the present invention have thus been discussed in the above description.

From the foregoing, the "three-way lamp assembly for automobiles" of the present invention serves to combine the functions of the third brake light, the parking and loading alaim light and the in-compartment reading light of an automobile into a single assembly; which lamp, assembly while serving the function of the third brake light during normal driving, may be used as the parking and loading alarm light when the truck is parked for loading or unloading cargoes. It should be emphasized that by providing the switch 34 and having it suitably associated with the opening and closing of the rear glass cover on the rear of the cargo compartment, the function of the present invention for signaling the parking of the truck can be automatically achieved, thus making it very ideal for practical use; furthermore, while the switch 34 controls the on and off of the in-compartment lighting lamp, the lamp, nevertheless, is also under the control of the switch 34, which is an excellent inprovement on the safety feature.

I claim:

1. An improved three-way lamp assembly for automobiles comprising:

an upper cover having a through passage in a rear half of said upper cover, and a front half thereof being provided with a bent recess of increasingly higher configuration into which a white, bent shaped lamp shade may be inserted for use as the lamp shade of a lighting/alarm lamp bulb; a right portion of said upper cover being a hollow body with an opening in a bottom thereof through which two control switches are installed;

a lower housing which is approximately in the shape of a rectangular box, front and rear edges of said box being provided with recesses, respectively, the recess on the front edge being in mating relation with the recess on the front half of said upper cover for inserting the bent shaped lamp shade; the recess on the rear edge being in mating relation with a recess on the rear half of said upper cover for inserting a red lamp shade for use as the lamp shade of a third brake lamp bulb; and the interior of said lower housing being divided into two spaces by a spacer plate;

a pair of lamp bulbs and a pair of bulb holders one of said pair of lamp bulbs and bulb holders being installed in each of said two spaces of said lower housing, respectively, one said bulbs being used for lighting/alarming purposes, the other used as a third brake light;

a front control switch for use in a cargo compartment to turn the lighting/alarming lamp bulb on or off; and a rear control switch for turning said lighting alarming lamp bulb on or off.

2. The three-way lamp assembly for automobiles according to claim 1 in which the bent shaped white lamp shade is of a two-piece configuration.

3. The three-way lamp assembly for automobiles according to claim 1 in which the rear control switch is of push type.

4. The three-way lamp assembly for automobiles according to claim 1 in which the rear control switch is a vacuum mercury switch.

* * * * *